Dec. 13, 1966   G. A. SCOTT   3,291,113
HOUSEHOLD COOKING OVENS PROVIDED
WITH SLIDABLY SUPPORTED RACKS
Filed June 7, 1965   2 Sheets-Sheet 2

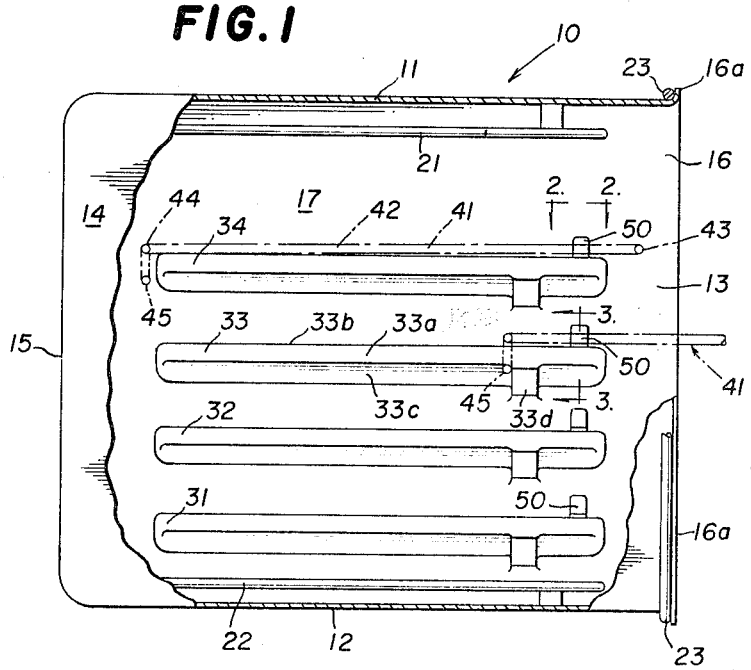

X250 (AS MADE)

X250 (AFTER 558 CYCLES)

United States Patent Office 3,291,113
Patented Dec. 13, 1966

3,291,113
HOUSEHOLD COOKING OVENS PROVIDED WITH SLIDABLY SUPPORTED RACKS
George A. Scott, Jeffersontown, Ky., assignor to General Electric Company, a corporation of New York
Filed June 7, 1965, Ser. No. 461,958
6 Claims. (Cl. 126—19)

The present invention relates to household cooking ovens that incorporate heat-cleaning facilities and that are provided with slidably supported racks or shelves of open wire-work construction for supporting the foods in the oven cooking cavities during cooking thereof; and it is a general object of the invention to provide in a cooking oven of the character noted, an improved arrangement for mounting the rack upon the side walls of the liner defining the oven cooking cavity for sliding movements into and out of the oven cooking cavity through the open front of the oven liner.

Specifically, the household cooking oven may be of the general character of that disclosed in U.S. Patent No. 3,121,158, granted on February 11, 1964 to Bohdan Hurko; whereby normal food-cooking operations are carried out in the oven cooking cavity by heating the air therein to a temperature in the normal food-cooking temperature range extending from about 150° F. to about 55° F.; and whereby food soils accumulated upon the interior surfaces of the walls of the oven liner defining the oven cooking cavity are cleaned therefrom by heating these walls to a temperature in the heat-cleaning temperature range extending from about 750° F. to about 950° F. In such a household cooking oven, the usual or conventional arrangement for supporting the rack or shelf of open wire-work construction that is ordinarily arranged in the oven cooking cavity has proven to be altogether unsatisfactory due fundamentally to the relatively high temperature to which it is heated in the heat-cleaning operation. Specifically, during a heat-cleaning operation the rack often becomes stuck upon its supports at the side walls of the oven liner, whereby it then becomes almost impossible to slide the rack with respect to the oven cooking cavity, all to the great inconvenience of the cook.

It has been discovered that the objectionable sticking of the rack upon its support at the side walls of the oven liner may be entirely eliminated by the provision of a pair of supports for the opposite sides of the rack adjacent to the front of the oven cooking cavity; wherein each of the supports is of improved and composite construction and arrangement; whereby it is another object of the invention to provide in a household cooking oven, rack supports of such improved and composite construction.

A further object of the invention is to provide in a household cooking oven of the character described, improved rack supports; wherein each of the rack supports comprises an inner backing member formed essentially of material selected from the class consisting of stainless steels and nickel-copper alloys, an outer bearing member formed essentially of fine silver, and an intermediate layer bonded both to the inner backing member and to the outer bearing member and formed essentially of a silver-copper that consists essentially of about 72% silver and about 28% copper by weight.

Further features of the invention pertain to the particular arrangement of the elements of the household cooking oven, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view, partly broken away, of a portion of a household electric oven of the general character of that disclosed in the previously mentioned Hurko patent, and incorporating rack-supporting structure embodying the present invention;

FIG. 2 is an enlarged fragmentary horizontal sectional view of one side of the oven liner incorporated in the oven, and illustrating one of the supports for the slidable rack arranged in the oven cooking cavity defined by the oven liner, this view being taken in the direction of the arrows along the line 2—2 in FIG. 1;

FIG. 3 is an enlarged fragmentary vertical sectional view of the one side of the oven liner, and illustrating another of the rack-supports, this view being taken in the direction of the arrows along the line 3—3 in FIG. 1;

FIG. 4 is a further enlarged exploded view of the rack support and the adjacent side wall of the oven liner, as shown in FIG. 3, and illustrating the elements of the rack-support prior to the assembly thereof;

FIG. 5 is a greatly enlarged fragmentary sectional view of the rack-support, as shown in FIG. 4, and illustrating the composite construction thereof, this view being taken in the direction of the arrows along the line 5—5 in FIG. 4;

Figure 6:
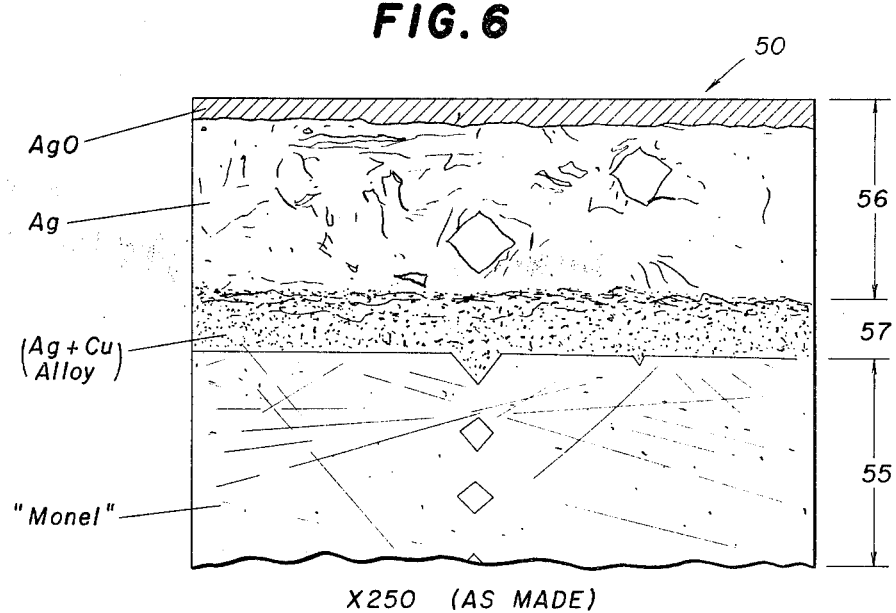
Figure 7:
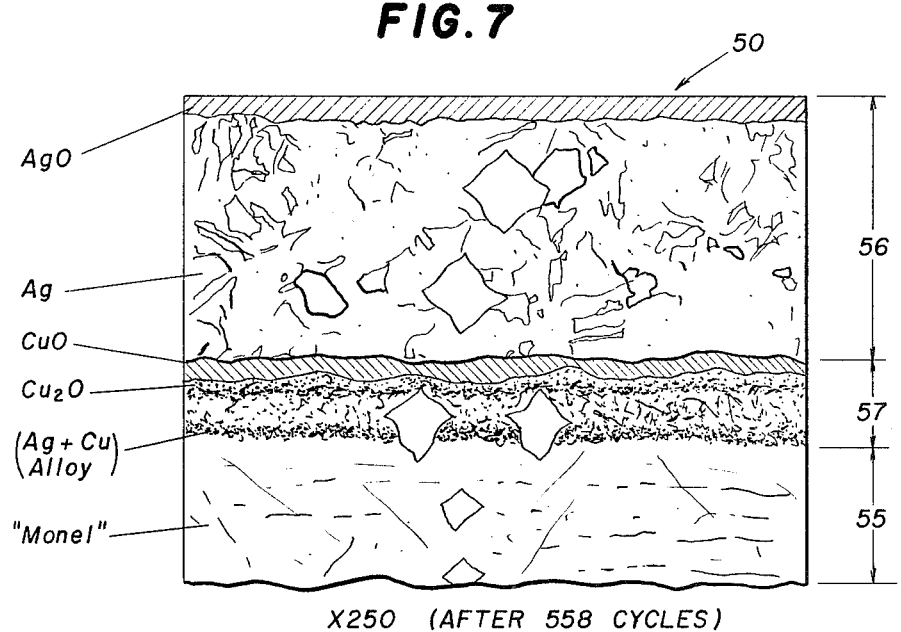

FIG. 6 is a representation of a photomicrograph of the section of the rack-support, as shown in FIG. 5, as the rack-support is made and prior to subjecting thereof to any heat-cleaning cycles or operations in the oven cooking cavity; and FIG. 7 is a representation of a photomicrograph of the section of the rack-support, similar to FIG. 6, after the rack-support is subjected to 558 heat-cleaning cycles or operations in the oven cooking cavity.

Referrring now to FIGS. 1 to 4, inclusive, of the drawings, there is illustrated a fragmentary part of a household electric cooking oven of the general construction and arrangement of that disclosed in the previously mentioned Hurko patent and incorporating rack-supporting structure embodying the features of the present invention. Specifically, this cooking oven comprises a metal oven liner 10 of box-like configuration, and including a top wall 11, a bottom wall 12, two side walls 13 and 14, and a rear wall 15, and having an open front, indicated at 16. Of course, the oven liner 10 is housed in a heat-insulated cabinet, not shown, that further includes a heat-insulated front door, not shown, that cooperates with the open front 16 of the liner 10 in a conventional manner. Preferably, the liner 10 is formed of low-carbon sheet steel and defines a cooking cavity 17 therein that is readily accessible through the open front 16, when the cooperating front door occupies its open position. The interior surfaces of the walls 11, 12, 13, 14 and 15 are provided with a continuous porcelain enamel coating in a conventional manner, the portion of this enamel coating carried by the side wall 13 being indicated at 13a only in FIG. 4. This enamel coating is of the glass frit type, has a thickness of several mils, and may be of any desired color, all in accordance with conventional practice.

Also, the oven comprises an upper heating unit 21 disposed adjacent to and below the top wall 11 and within the cooking cavity 17, a lower heating unit 22 disposed adjacent and above the bottom wall 12 and within the cooking cavity 17, and a front heating unit 23 disposed in surrounding relation with the open front 26 and exteriorly of the cooking cavity 17. Specifically, the front heating unit 23 is arranged just rearwardly of an outwardly flange 16a surrounding the open front 16 and carried by the front portions of the corresponding walls 11, 12, 13 and 14, as best shown in FIG. 1. Each of the heating units 21, 22 and 23 is preferably of the sheathed electric heating conductor type; and the two heating units 21 and 22 are normally so constructed and arranged that they may be placed and removed, as desired, with respect to the cooking cavity 17, all in a conventional manner.

In carrying out a broiling operation in the cooking cavity 17, the upper heating unit 21 is ordinarily energized above, with the front door in its partially open position. In carrying out a baking operation in the cooking cavity 17, both the upper heating unit 21 and the lower heating unit 22 are energized, with the front door in its closed position. In carrying out a heat-cleaning operation in the cooking cavity 17, all three of the heating units 21, 22 and 23 are energized, with the front door in its closed position. The circuit details involved in these operations have not been illustrated, since they form no part of the present invention, and since such circuit details are disclosed in the Hurko patent noted.

Further considering the construction of the oven liner 10, a group of vertically spaced-apart guide rails 31, 32, 33 and 34 are carried by the side wall 13 and a corresponding group of vertically spaced-apart guide rails, not shown, are carried by the side wall 14; which two groups of side rails are arranged in matched pairs respectively disposed in a corresponding plurality of substantially horizontal planes positioned in vertically spaced-apart stacked relation with each other. In the arrangement, four of the pairs of guide rails have been indicated for purposes of illustration. The eight individual guide rails mentioned are substantially identical; whereby the guide rail 33, for example, is of elongated form terminating at the front end thereof somewhat rearwardly of the open front 16 and terminating at the rear end thereof somewhat forwardly of the rear wall 15. The guide rail 33 is embossed from the metal of the side wall 13 so that the same is integral with the side wall 13 and projects inwardly into the cooking cavity 17, as clearly shown in FIGS. 2 and 3. Specifically, the guide rail 33 comprises a middle part 33a spaced well inwardly from the side wall 13, a curved upper part 33b joining the top of the middle part 33a and the adjacent portion of the side wall 13 positioned thereabove, and a curved lower part 33c joining the bottom of the middle part 33a and the adjacent portion of the side wall 13 positioned therebelow. Also an inwardly projecting stop 33d is formed in the lower part 33c adjacent to the front end of the guide rail 33; which stop 33d is embossed in the lower part 33c and is thus integral therewith and with the side wall 13.

One or more substantially identical racks or shelves 41 are provided in the cooking cavity 17; and each of these racks 41 is of conventional open wire-work construction. Preferably, each rack 41 is formed essentially of cold-rolled steel rod sections suitably welded together into a strong unitary structure; and thereafter the exterior surfaces of the rack 41 are coated with a protective layer, such, for example, as a nickel coating that may be suitably plated thereupon in a known manner. The rack 41 comprises a pair of side bars 42 that directly engage the respective side rails of a pair, a front rod 43, a rear rod 44, a plurality of intermediate rods, not shown, each extending between the front rod 43 and the rear rod 44, and a pair of hooks 45 respectively carried at the rear ends of the side rods 42 and respectively cooperating with the two supporting side rails of the pair.

Thus, the rack 41 is slidably mounted in the cooking cavity 17 by any cooperating pair of side rails for selective movements into and out of the open front 16, so as to accommodate ready placement and removal of cooking vessels, not shown, with respect to the cooking cavity 17 in a conventional manner. The rack 41 may be detachably connected from any pair of side rails when the same is pushed fully rearwardly, so that the hooks 45 clear the rear ends of the side rails; whereby the rear end of the rack 41 may then be lifted over the rear ends of the side rails, so that the rack 41 may then be slid forwardly out of the open front 16 and completely out of the cooking cavity 17. When the rack 41 is merely slid forwardly upon the pair of supporting side rails, the hooks 45 engage the associated pair of stops (33c, etc.), so as to limit forward sliding movement of the rack 41; whereby this cooperation of the pair of hooks 45 and the associated pair of stops positively prevents undesirable forward overtravel of the rack 41.

In accordance with the present invention, the two side rails of each pair are respectively provided adjacent to the front ends thereof with two especially constructed supports 50 that respectively directly engage and slidably carry the front portions of the two side rods 42 of the supported rack 41, as best shown in FIGS. 1 and 3.

Referring now to FIG. 4, each of the supports 50 is carried by a metal stud 60 that is preferably formed of 430 stainless steel; which stud 60 includes a shank 61 terminating at the rear end thereof in an enlarged head 62 that is directly rigidly secured to the adjacent support 50, as by welding. The front end of the shank 61 terminates in a forwardly tapered pilot portion 62; and the intermediate section of the shank 61 is provided with a group of adjacent annular serrations 64. The stud 60 cooperates with a metal fastening clip 70 that is preferably formed of spring steel; which fastening clip 70 includes a ring-like front end 71 carrying a plurality of resilient fingers 72 projecting rearwardly and outwardly therefrom; which fingers 72 carry spurs 73 that are adapted to cooperate with the serrations 64 carried on the shank 61; and which fingers 72 are adapted to cooperate with a hole formed in the adjacent side wall 13 or 14. As illustrated in FIG. 4, the fingers 72 are adapted to cooperate with the hole 13b formed in the side wall 13 just above the adjacent side rail 31, 32, etc.

Referring now to FIGS. 2, 3 and 4, in order to secure the support 50 to the adjacent side wall 13 of the liner 10, the front end 71 of the clip 70 is inserted into the cooperating hole 13b provided in the side wall 13, and the front pilot end 63 of the stud 60 is inserted into the rear end of the clip 70 and between the fingers 72. The support 50 is then forcefully urged toward the side wall 13; whereby the fingers 72 are forced through the hole 13b, as the shank 61 is forced through the fingers 72. When the support 50 is forced into its normal position, as shown in FIGS. 2 and 3, the head 62 engages the adjacent surface of the side wall 13 surrounding the hole 13b, the spurs 73 dig into the serrations 64 to lock the clip 70 to the stud 60, and the fingers 72 engage the interior of the hole 13b to restrain the stud 60, and consequently the support 50, in place.

In the manufacture of the liner 10, the same is first formed, and then the interior thereof is provided with the porcelain enamel coating; all in a well-known manner. Then the holes 13b formed in the various walls 13, etc., of the liner are reopened to insure that none of them is plugged by the porcelain enamel mentioned, so as positively to prevent interference with the securing in place of the supports 50, as described above.

As best shown in FIGS. 2, 3 and 4, the support 50 comprises a concave body into which the head 62 of the stud 60 is welded, and the top of the support 50 slopes upwardly and outwardly towards the adjacent side wall 13, as indicated at 51. Also, the opposite sides of the support 50 slope outwardly towards the adjacent side wall 13, as indicated at 52. Finally, the bottom of the support 50 slopes downwardly and inwardly, as indicated at 53, and over the adjacent upper part 33b, etc., of the cooperating side rail 33, etc. Hence, it is the bottom 53 of the support 50 that is positioned above the adjacent upper part 33b of the cooperating side rail 33 and that directly engages and supports the side rod 42 of the supported rack 41, as clearly shown in FIG. 3.

The support 50 is of composite or laminated construction comprising, as best shown in FIG. 5, an inner backing member 55 that is disposed immediately adjacent to the side wall 13 and to which the head 62 of the stud 60 is welded, an outer bearing member 56 that directly engages the side rod 42 of the rack 41, and an intermediate layer 57 that is intimately bonded both to the adjacent surface of the backing member 55 and to the adjacent surface of the bearing member 56. The inner backing member 55 is formed essentially of material selected from the class consisting of stainless steels and nickel-copper alloys; the outer bearing member 56 is formed essentially of fine silver; and the intermediate layer 57 is formed essentially of a silver-copper alloy that consists essentially of about 72% silver and about 28% copper by weight. Specifically in the backing member 55 it has been found that "Monel," commonly referred to as wrought "Monel," is admirably suited for the present purpose; such wrought "Monel" comprising a nickel-copper alloy and consisting essentially of about 67% nickel, 30% copper, 1.4% iron and 1% manganese by weight. Also, 430 stainless steel is highly satisfactory for the present purpose; which 430 stainless steel consists essentially of chromium in the approximate range 16% to 18%, and the balance principally iron, by weight. Further 304 stainless steel is highly satisfactory for the present purpose; which 304 stainless steel consists essentially of chromium in the approximate range 17% to 19%, nickel in the approximate range 7% to 9%, and the balance principally iron, by weight. In the construction of the support 50, as shown in FIG. 5, the backing member 55 may have a thickness in the range 0.008" to 0.017", the intermediate layer, 57 may have a thickness in the general range 0.002" to 0.004", and the bearing member 56 may have a thickness in the general range 0.005" to 0.007". However, the total thickness of the support 50 should fall in the general range 0.019" to 0.024".

In the manufacture of the support 50, a composite assembly is first produced by stacking three sheets of the respective materials 55, 56 and 57 and two thin sheets of a brazing alloy, the two sheets of brazing alloy being respectively disposed on opposite sides of the intermediate layer 57. This assembly is then furnace brazed under sufficient pressure to produce a composite billet with the intermediate layers intimately bonded to the contacting areas of the respectively adjacent layers 55 and 56. This composite billet is then rolled to the required thickness in standard breakdown rolls; and subsequently the rolled billet is annealed. Of this fabricated sheet, the individual supports 50 are cut; and thereafter the heads 62 of the studs 60 are suitably welded to the backing members 55, so as to produce the finished supports 50.

The advantages of the construction and arrangement of the support 50 will be appreciated from a consideration of FIGS. 6 and 7, wherein there are depicted two representations produced from two corresponding photomicrographs made from a support 50 as it was received (FIG. 6) and after use of the support in 558 heat-cleaning operations or cycles of the household cooking oven (FIG. 7). Referring first to FIG. 6, it will be observed that a thin layer of AgO is readily and quickly formed in air on the outer exposed surface of the fine silver bearing member 56, that the intermediate layer 57 of Ag-Cu alloy is substantially homogeneous and eutectic in character, and that the backing member 55 is formed of "Monel." Now when the cooking oven is subjected to a heat-cleaning cycle, in the manner previously explained, the temperature of the thin AgO layer on the exposed surface of the outer bearing member 56 rises into the heat-cleaning temperature range (750° F. to 950° F.); whereby the AgO layer is decomposed with the production of silver and atomic oxygen. However, the bearing member 56 formed of fine silver is porous to the atomic oxygen mentioned, and the pressure is toward the alloy layer 57; whereby the atomic oxygen diffuses through the bearing member 56 into the alloy layer 57 reacting the same ultimately to produce a CuO layer adjacent to the bearing member 56 and a $Cu_2O$ layer adjacent to the unreacted portion of the alloy layer 57; all as shown in FIG. 7. Thus, the alloy layer 57 arrests the further diffusion of the atomic oxygen therethrough and into the backing member 55 by the simple process of reacting all of the atomic oxygen mentioned to produce the oxides (CuO and $Cu_2O$) that are stable in the heat-cleaning temperature range mentioned.

As clearly shown in FIG. 7, after 558 heat-cleaning cycles of the cooking oven, the alloy layer 57 is not nearly completely reacted and there is no reaction of the backing member 55. Also, it is mentioned that the usual household cooking oven is not subjected to 558 heat-cleaning cycles in 10 years, which is longer than the orinary life of the cooking oven. In passing it is noted that the particular number (558) of cycles of heat-cleaning to which the support 50 was subjected before the photomicrograph was taken from which FIG. 7 was produced is of no particular moment, but this is indeed a large number of cycles with no substantial damage to the support 50.

After each heat-cleaning cycle, the AgO layer again forms in air on the exposed surface of the bearing member 56, notwithstanding the prior decomposition of a similar AgO layer on the exposed surface of the bearing member 56 during the heat-cleaning cycle. At this point it is mentioned that AgO decomposes at a temperature below 212° F., that $Ag_2O$ decomposes at about 572° F., while the melting point of silver is about 1761° F.; whereby in the heat-cleaning cycle the silver oxides are definitely decomposed, without melting of the silver. Thus, in a life cycle of the support 50 enough atomic oxygen is ultimately diffused through the bearing member 56 to effect reaction of all of copper in the silver-copper alloy layer 57, with the consequent failure of the support 50, fundamentally by the production of blisters in the bearing member 56 at the reacted alloy layer 57, so that the bearing member 56 is at least partially detached or peeled from the backing member 55. However, this life cycle of the support 50 is in excess of 1,000 heat-cleaning cycles of the cooking oven.

The construction of the supports 50 employing the backing members 55 formed of 430 stainless steel and 304 stainless steel, as previously described, were even superior to the construction of the support 50 employing the backing member 55 formed of "Monel," in the particular that the life cycles of the supports 50 employing the stainless steels noted were in excess of 1450 heat-cleaning cycles of the cooking oven. However, the construction of the support 50 employing the backing member 55 formed of "Monel" is somewhat cheaper to manufacture and is altogether satisfactory in service, since the same has a life cycle in excess of 1000 heat-cleaning cycles of the cooking oven, as noted above.

The remarkable life cycle of the support 50 will be appreciated when it is noted that a similar test support, but with the omission of the intermediate layer of silver-copper alloy, has a life cycle of only about 20 heat-cleaning cycles of the cooking oven. A wide variety of other test supports, all devoid of the intermediate layer of silver-copper alloy, were also characterized by early failure for the simple reason that in each case the atomic oxygen produced by the decomposition of the silver oxide or oxides rapidly diffused through the silver bearing member into the base metal backing member, whereby the atomic oxygen rapidly oxidized and destroyed the backing member, even when it was formed of "Monel," 430 stainless steel, and a variety of other normally non-corrosive metals. Of course, these test results are not altogether surprising, since atomic oxygen constitutes a powerful oxidizing agent; whereby the backing member is rapidly destroyed, rendering the support inoperative for the present purpose.

In the improved support 50 the silver bearing member 56 constitutes an ideal composition for slidably supporting the rack 41, without sticking of the rack 41 following a heat-cleaning cycle in the cooking oven, but the same is productive of atomic oxygen in the heat-cleaning cycle, as expained above. However, in the improved support 50, this atomic oxygen is not destructive of the intermediate layer 57 solely because of the particular composition (silver-copper alloy) of the intermediate layer 57 that is bonded to the respective members 56 and 55. This silver-copper alloy layer 57 is thus effective to prevent damage to the backing member 55 by the simple process of reacting all the atomic oxygen therein to produce CuO and $Cu_2O$. Thus, the silver-copper alloy layer 57 serves not only as a bonding layer between the members 56 and 55, but also as an atomic oxygen barrier layer protecting the backing member 55 against oxidation and the consequent destruction thereof over an exceeding large number of heat-cleaning cycles of the cooking oven.

In the arrangement, the supports 50 not only accommodate ready sliding of the side bars 42 of rack 41, but prevent any substantial wear of the porcelain enamel carried by the adjacent upper surfaces of the parts 33b of the rails 33; thereby substantially to extend the useful life of the liner 10.

In view of the foregoing, it is apparent that there has been provided in a household cooking oven that incorporates facility for heat-cleaning the oven cooking cavity therein, an improved arrangement for slidably supporting the racks or shelves in the oven cooking cavity.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a household oven including a metal liner defining a cooking cavity, a heating system operative to heat said liner and the air in said cooking cavity, whereby normal food-cooking operations may be carried out in said cooking cavity in the normal food-cooking temperature range extending from about 150° F. to about 550° F. and whereby food soils accumulated upon the interior surfaces of said liner may be cleaned therefrom in the heat-cleaning temperature range extending from about 750° F. to about 950° F., said liner being of box-like form including a pair of laterally spaced-apart upstanding side walls and having an open front, a pair of elongated metal rails respectively carried by said side walls and respectively projecting inwardly therefrom into said cooking cavity and arranged in a generally horizontal plane, and a metal rack arranged in said cooking cavity and mounted upon said rails for sliding movements into and out of said cooking cavity through the open front of said liner; the combination comprising a pair of supports respectively carried by said side walls and respectively arranged adjacent to the front portions of said rails and respectively engaging and supporting the opposite sides of said rack in its sliding movements; each of said supports being of composite construction and comprising an inner backing member formed essentially of material selected from the class consisting of stainless steels and nickel-copper alloys, an outer bearing member formed essentially of fine silver, and an intermediate layer bonded both to said inner backing member and to said outer bearing member and formed essentially of a silver-copper alloy that consits essentially of about 72% silver and about 28% copper by weight.

2. In a household oven including a sheet metal liner defining a cooking cavity, said liner being of box-like form including a pair of laterally spaced-apart upstanding side walls and having an open front, a pair of elongated metal rails respectively formed integrally with said side walls and respectively projecting inwardly therefrom into said oven cavity and arranged in a generally horizontal plane, a porcelain enamel coating carried by the interior surfaces of said liner and by the exposed surfaces of said rails, a heating system operative to heat said liner and the air in said cooking cavity, whereby normal food-cooking operations may be carried out in said oven cavity in the normal food-cooking temperature range extending from about 150° F. to about 550° F. and whereby food soils accumulated upon the exposed surfaces of said coating may be cleaned therefrom in the heat-cleaning temperature range extending from about 750° F. to about 950° F. and a metal rack arranged in said cooking cavity and mounted upon said rails for sliding movements into and out of said cooking cavity through the open front of said liner; the combination comprising a pair of supports respectively carried by said side walls and respectively arranged adjacent to the front portions of said rails and respectively engaging and supporting the opposite sides of said rack in its sliding movements; each of said supports being of composite construction and comprising an inner backing member formed essentially of material selected from the class consisting of stainless steels and nickel-copper alloys, an outer bearing member formed essentially of fine silver, and an intermediate layer bonded both to said inner backing member and to said outer bearing member and formed essentially of a silver-copper alloy that consists essentially of about 72% silver and about 28% copper by weight.

3. In a household oven including a metal liner defining a cooking cavity, a heating system operative to heat said liner and the air in said cooking cavity, whereby normal food-cooking operations may be carried out in said cooking cavity in the normal food-cooking temperature range extending from about 150° F. to about 550° F. and whereby food soils accumulated upon the interior surfaces of said liner may be cleaned therefrom in the heat-cleaning temperature range extending from about 750° F. to about 950° F., said liner being of box-like form including a pair of laterally spaced-apart upstanding side walls and having an open front, a pair of elongated metal rails respectively carried by said side walls and respectively projecting inwardly therefrom into said cooking cavity and arranged in a generally horizontal plane, and a metal rack arranged in said cooking cavity and mounted upon said rails for sliding movements into and out of said cooking cavity through the open front of said liner; the combination comprising a pair of supports respectively carried by said side walls and respectively arranged adjacent to the front portions of said rails and respectively engaging and supporting the opposite sides of said rack in its sliding movements, each of said supports being of composite construction and comprising an inner backing member having a tchickness in the general range 0.019" to 0.024" and formed essentially of material selected from the class consisting of stainless steels and nickel-copper alloys, an outer bearing member having a thickness in the general range 0.005" to 0.007" and formed essentially of fine silver, and and intemediate layer having a thickness in the general range 0.002" to 0.004" and bonded both to said inner backing member and to said outer bearing member and formed essentially of a silver-copper alloy that consists essentially of about 72% silver and about 28% copper by weight.

4. In a household oven including a metal liner defining a cooking cavity, a heating system operative to heat said liner and the air in said cooking cavity, whereby normal food-cooking operations may be carried out in said cooking cavity in the normal food-cooking temperature range extending from about 150° F. to about 550° F. and whereby food soils accumulated upon the interior surfaces of said liner may be cleaned therefrom in the heat-cleaning temperature range extending from about 750° F. to about 950° F, said liner being of box-like form including a pair of laterally spaced-apart upstanding side walls and having an open front, a pair of elongated metal rails respectively carried by said side walls and respectively projecting inwardy therefrom into said cooking cavity and arranged in a generally horizontal plane, and a metal rack arranged in said cooking cavity and mounted upon said rails for sliding movements into and out of said cooking cavity through the open front of said liner; the combination comprising a pair of supports respectively carried by said side walls and by the top front portions of said rails and respectively engaging and supporting the opposite sides of said rack units sliding movements; each of said supports being of strip-like form and of composite construction comprising an inner backing member, an outer bearing member, and an intermediate layer bonded both to said inner backing member and to said outer bearing member, said inner backing member being formed of strong and non-corrosive metal, said outer bearing member being formed of fine silver, and said intermediate layer being formed of a silver-copper alloy that consists essentially of about 72% silver and 28% copper by weight.

5. In an oven including a metal liner defining a cooking cavity, a heating system operative to heat said liner and the air in said cooking cavity, wherein the air in said cooking cavity may be heated to a temperature at least as high as 750° F., said liner being of box-like form including a pair of laterally spaced-apart upstanding side walls and having an open front, a pair of elongated metal rails respectively carried by said side walls and respectively projecting inwardly therefrom into said cooking cavity and arranged in a generally horizontal plane, and a metal rack arranged in said cooking cavity and mounted upon said rails for sliding movements into and out of said cooking cavity through the open front of said liner; the combination comprising a pair of supports respectively carried by said side walls and respectively arranged adjacent to the front portions of said rails and respectively engaging and supporting the opposite sides of said rack in its sliding movements; each of said supports being of composite construction and comprising an inner backing member formed essentially of material selected from the class consisting of stainless steels and nickel-copper alloys, an outer bearing member formed essentially of silver, and an intermediate layer bonded both to said inner backing member and to said outer bearing member and formed essentially of a silver-copper alloy.

6. In an oven including a metal liner defining a cooking cavity, a heating system operative to heat said liner and the air in said cooking cavity, wherein the air in said cooking cavity may be heated to a temperature at least as high as 750° F., said liner being of box-like form including a pair of laterally spaced-apart upstanding side walls and having an open front, a pair of elongated metal rails respectively formed integrally with said side walls and respectively projecting inwardly therefrom into said cooking cavity and arranged in a generally horizontal plane, a porcelain enamel coating carried by the interior surfaces of said liner and by the exposed surfaces of said rails, and a metal rack arranged in said cooking cavity and mounted upon said rails for sliding movements into and out of said cooking cavity through the open front of said liner; the combination comprising a pair of supports respectively carried by said side walls and respectively arranged adjacent to the front portions of said rails and respectively engaging and supporting the opposite sides of said rack in its sliding movements, whereby said supports minimize wear of said porcelain enamel coating carried by the exposed surfaces of said rails by the sliding movements of said rack; each of said supports being of composite construction and comprising an inner backing member formed essentially of material selected from the class consisting of stainless steels and nickel-copper alloys, an outer bearing member formed essentially of silver, and an intermediate layer bonded both to said inner backing member and to said outer bearing member and formed essentially of a silver-copper alloy.

References Cited by the Examiner
UNITED STATES PATENTS 2,225,762 12/1940 Barnsteiner _____ 126—19 X
2,797,680 7/1957 Nagel _____ 126—19

FREDERICK L. MATTESON, JR., *Primary Examiner.*

E. G. FAVORS, *Assistant Examiner.*

UNITED STATES PATENT OFFICE
CERTIFICATE OF CORRECTION

Patent No. 3,291,113            December 13, 1966

George A. Scott

It is hereby certified that error appears in the above numbered patent requiring correction and that the said Letters Patent should read as corrected below.

Column 7, line 67, for "consits" read -- consists --; column 8, line 52, for "tchickness" read -- thickness --; line 57, for "and and intemediate" read -- and an intermediate --; column 9, line 9, for "units" read -- in its --.

Signed and sealed this 19th day of September 1967.

(SEAL)
Attest:

ERNEST W. SWIDER
Attesting Officer

EDWARD J. BRENNER
Commissioner of Patents